April 7, 1925.

J. A. PRIVETT

ILLUMINATING MEANS FOR MOTOR METERS

Filed Oct. 13, 1923

1,532,155

2 Sheets-Sheet 1

Witnesses:

Inventor
J. A. Privett

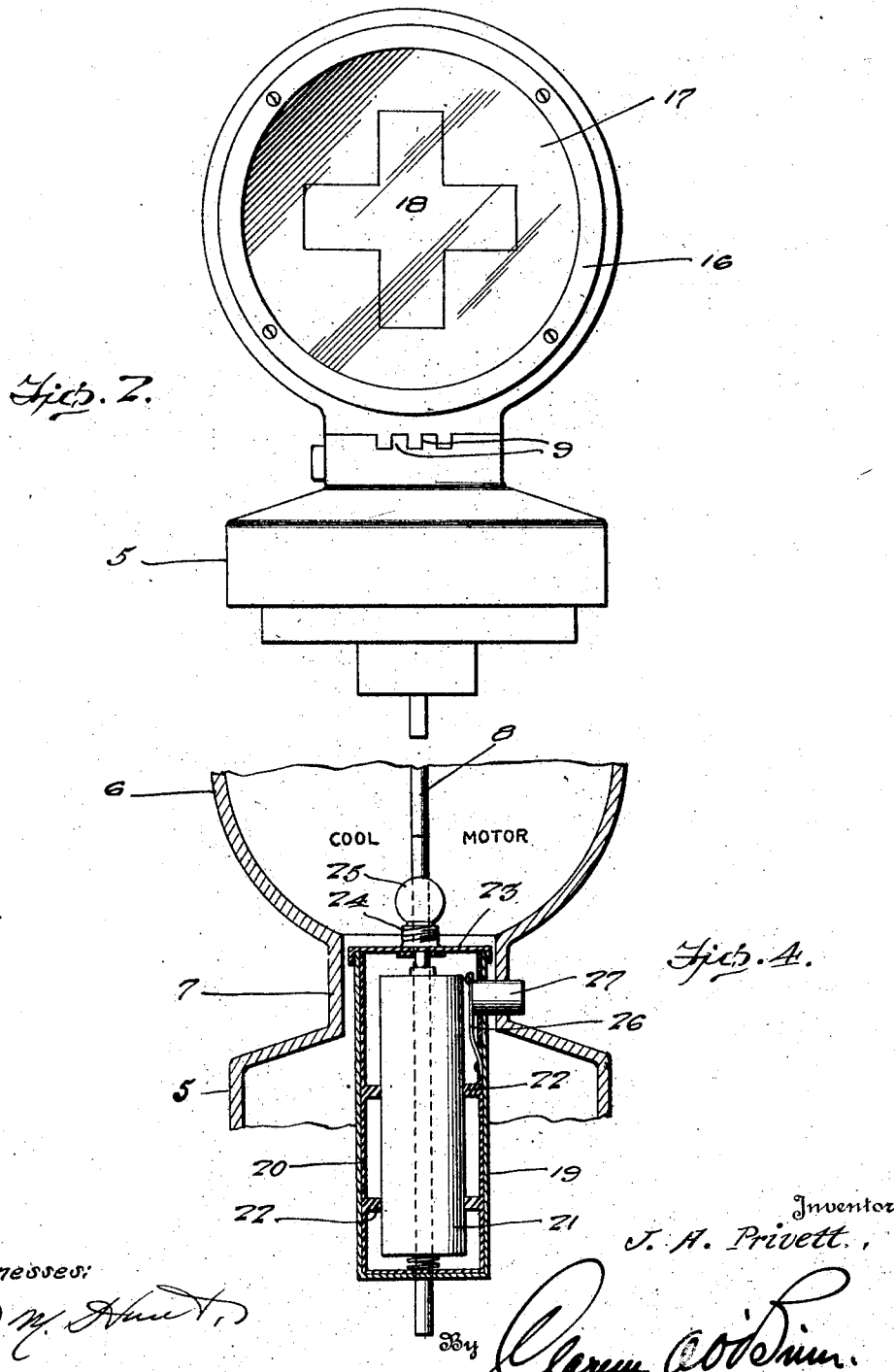

Patented Apr. 7, 1925.

1,532,155

UNITED STATES PATENT OFFICE.

JOSEPH A. PRIVETT, OF MONROE, NORTH CAROLINA.

ILLUMINATING MEANS FOR MOTOR METERS.

Application filed October 13, 1923. Serial No. 668,322.

*To all whom it may concern:*

Be it known that I, JOSEPH A. PRIVETT, a citizen of the United States, residing at Monroe, in the county of Union and State of North Carolina, have invented certain new and useful Improvements in Illuminating Means for Motor Meters, of which the following is a specification.

This invention relates to motor meters and has more particular reference to a device of this character wherein the same includes a source of illumination for effectively allowing the readings of the thermometer to be viewed at night time, without the necessity of striking a match or carrying a portable lighting outfit to the motor meter.

The primary object of the invention resides in the provision of a motor meter that includes as a part thereof a source of illumination which is preferably in the form of an electric light that receives its source of electric supply from a battery carried directly within the motor meter or from the usual lighting and starting battery of the vehicle, it being necessary in this last mentioned instance that a suitable wiring system be provided between said electric light and said storage battery, a desirable form of hand switch being carried by said motor meter whereby the current from the source of supply may be readily switched on whenever it is desired to illuminate the motor meter.

With the above salient objects in view, and others that will become apparent as the nature of the invention is better understood, the same comprises the novel form, combination and arrangement of parts hereinafter more fully described, shown in the accompanying drawings and claimed.

Figure 1:
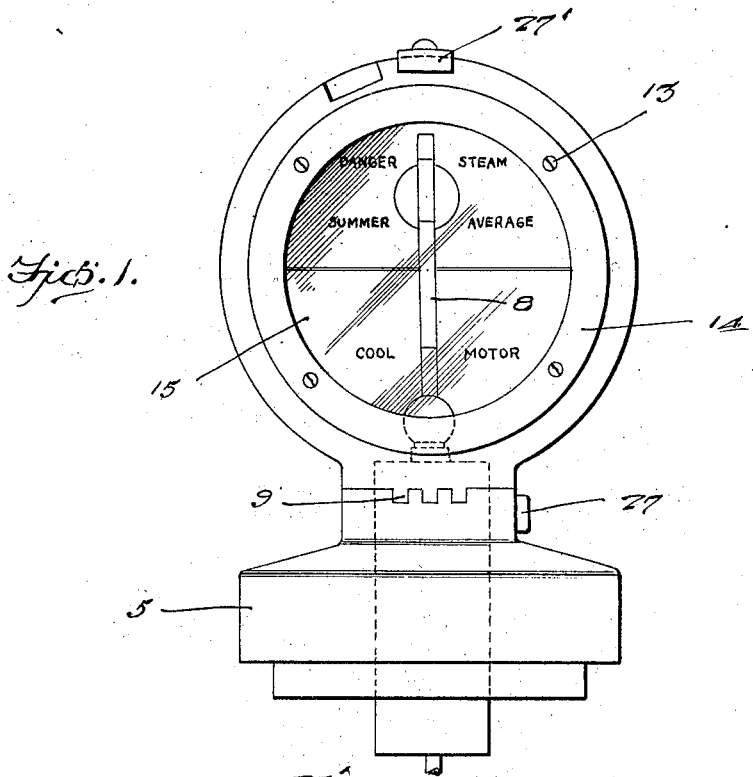
Figure 3:
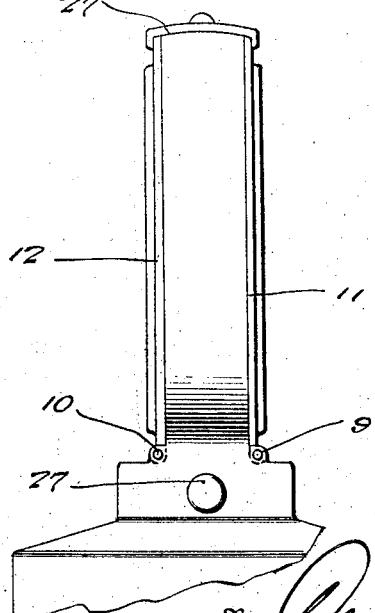

In the drawings wherein there is shown the most preferable embodiment of the invention with which I am at the present time familiar and wherein like reference characters indicate corresponding parts throughout the several views, Figure 1 is an elevational view of the rear side of a motor meter constructed in accordance with the present invention, Figure 2 is a similar view of the opposite side thereof, Figure 3 is an edge elevational view of my improved motor meter, and Figure 4 is a detailed fragmentary cross sectional view of a motor meter constructed in accordance with my invention.

Now having particular reference to the drawings, my novel motor meter comprises the usual cap portion 5, an open sided circular rim portion 6 intergrally joined together by the connecting neck portion 7.

Extending upwardly through said cap, rim and neck portions of the motor meter is the usual glass mercury tube 8.

Hingedly secured to the upper edge of the connecting neck portion 7 at opposite open sides of the rim portion 6 as designated at 9 and 10, respectively, are flat metal rings 11 and 12. These flat metal rings are of a diameter similar to the diameter of the rim 6 and are adapted to be swung up into close contact therewith, as more clearly shown in the edge elevational view, Figure 3. Adapted to be secured to the ring 11 upon the rear side of the motor meter through the medium of set screws or the like 13, is a circular brass plate carrying rim 14 within which is positioned a glass plate 15 that has different indicating words thereon for facilitating the readings of the thermometer.

Similarly secured to the ring 12 at the front side of the thermometer rim 6 is a circular plate carrying rim 16 that carries a plate 17 of glass or other translucent material upon which is formed any suitable design or emblem 18, Figure 2.

Suitably supported within the cap and neck portion 5 and 7 of the motor meter is a tubular metal container 19 that is lined interiorly with rubber or other insulation 20 and within which is adapted to be positioned a dry cell battery 21 it being of course understood that the upper end of said receptacle 19 is opened for allowing the insertion of said battery thereinto. The lining of insulation 20 is formed interiorly with circular spacing flanges 22 for preventing any relative movement of the battery within the receptacle and the consequent wearing away of the lining of insulation 20 which would result in the short-circuiting of the battery 21.

The receptacle 19 is provided with a closure 23 which is formed centrally upon its outer side with a screw-threaded sleeve 24 that opens within said receptacle and that is adapted for receiving an electric bulb 25. This electric bulb 25 is adapted to be placed in circuit with the storage battery 21 through the medium of any suitable form of switch 26 that includes a button 27 that has sliding movement through registering openings in the receptacle 19 and neck portion 7 of the motor meter whereby the same may be conveniently operated.

Referring back to the rim portion 6 of the motor meter and the hinged rings 11 and 12, it will be noted from a consideration of Figures 1 and 3 that these rings 11 and 12 are maintained in the position shown through the medium of a double ended spring clasp 27' that is carried by the top side of said rim 6.

In view of the above description when considered in conjunction with the accompanying drawings, it is believed by me that the advantages of a motor meter of the present nature will be at once appreciated by those skilled in the art and that I have provided an article that will meet with all of the requirements for a successful commercial use.

Minor changes may be made within the invention without departing from the spirit and scope of the appended claim.

Having thus described my invention, what I claim as new and desire to secure by Letters Patent is:—

A motor meter comprising a casing having a rim portion and a neck portion, the rim portion being open at its opposite sides and the openings thereof covered with transparencies, a thermometer extending through the neck portion and entering the rim portion, a battery support located in the neck portion, a bulb mounted upon said support and disposed in the rim portion between the transparencies and a push button switch mechanism passing transversely through the battery support and the neck portion of the casing.

In testimony whereof I affix my signature.

JOE A. PRIVETT.